(12) United States Patent
Ribeiro et al.

(10) Patent No.: US 11,773,234 B2
(45) Date of Patent: Oct. 3, 2023

(54) SILICA GEL AS REINFORCEMENT AGENT FOR RUBBER COMPOUNDS

(71) Applicant: PQ, LLC, Malvern, PA (US)

(72) Inventors: Flavio Ernesto Ribeiro, Plainfield, IL (US); Ronaldo dos Santos Flor, Sao Paulo (BR)

(73) Assignee: PQ, LLC, Malvern, PA (US)

( * ) Notice: Subject to any disclaimer, the term of this patent is extended or adjusted under 35 U.S.C. 154(b) by 32 days.

(21) Appl. No.: 17/665,917

(22) Filed: Feb. 7, 2022

(65) Prior Publication Data

US 2022/0251334 A1    Aug. 11, 2022

Related U.S. Application Data

(60) Provisional application No. 63/147,306, filed on Feb. 9, 2021.

(51) Int. Cl.
*C08K 3/36* (2006.01)
*C08K 7/26* (2006.01)

(52) U.S. Cl.
CPC .......... *C08K 3/36* (2013.01); *C08K 7/26* (2013.01); *C08K 2201/005* (2013.01); *C08K 2201/006* (2013.01)

(58) Field of Classification Search
CPC ... C08K 3/36; C08K 2201/00; C08K 2201/06
See application file for complete search history.

(56) References Cited

U.S. PATENT DOCUMENTS

| | | | |
|---|---|---|---|
| 5,336,730 A | 8/1994 | Sandstrom et al. | |
| 5,804,636 A | 9/1998 | Nahmias et al. | |
| 6,313,210 B1 | 11/2001 | Lin et al. | |
| 8,440,750 B2 | 5/2013 | Hahn et al. | |
| 9,034,962 B2 | 5/2015 | Lin et al. | |
| 2003/0216489 A1* | 11/2003 | Wang | C08K 9/06 524/495 |
| 2005/0282934 A1* | 12/2005 | Brinkmann | C09D 7/68 524/493 |
| 2010/0152370 A1 | 6/2010 | Steinhauser et al. | |
| 2011/0060083 A1 | 3/2011 | Hahn et al. | |
| 2016/0200899 A1 | 7/2016 | Forciniti et al. | |
| 2021/0189096 A1* | 6/2021 | Dos Santos Freire | C08K 3/36 |

FOREIGN PATENT DOCUMENTS

WO    20200247672 A1    12/2020

OTHER PUBLICATIONS

International Search Report for PCT/US2022/015610 dated May 11, 2022.
Written Opinion of the International Searching Authority for PCT/US2022/015610 dated May 11, 2022.

* cited by examiner

*Primary Examiner* — Ling Siu Choi
*Assistant Examiner* — Andrea Wu
(74) *Attorney, Agent, or Firm* — Buchanan Ingersoll & Rooney PC

(57) ABSTRACT

The claimed invention refers to the development of rubber recipes to improve essential properties related to correlated rubber compounds. Silica gel is added to the rubber compound as a reinforcing agent, partially replacing some of the precipitated silica. The use of silica gel for the pneumatic market provides improved tear resistance, elongation and adhesion performance, and improves adhesion of the tire on wet surfaces.

7 Claims, 4 Drawing Sheets

SILICA GEL AS REINFORCEMENT AGENT FOR RUBBER COMPOUNDS

CROSS-REFERENCE TO RELATED APPLICATIONS

This application claims benefit of priority to U.S. Provisional Patent Application No. 63/147,306, filed on Feb. 9, 2021, and incorporated by reference herein.

FIELD OF THE INVENTION

The present invention is directed to the field of rubber compounds and, more specifically, to the field of additives that improve the performance of the rubber compounds. It has been surprisingly found that silica gel when used as a partial and/or additional substitute for precipitated silica in rubber compounds, such as those used in tires, improves the mechanical and dynamic properties related to tear resistance, provides a higher level of elongation at break, and provides greater adhesion of tires on wet surfaces.

BACKGROUND OF THE INVENTION

It is desirable in tire production to use vulcanized rubber compounds that show skid resistance, greater resistance to tear and greater elongation at break. Inorganic fillers, such as precipitated silica, have been used to promote improvements in tear resistance, greater elongation at break and adhesion on wet surfaces when used on tire treads.

A rubber compound usually consists of a combination of 15 components, which are vigorously mixed in high shear intensity. Fillers, such as precipitated silica and carbon black, are typically added to the polymer to promote the reinforcement of the compound from the interaction with the rubber matrix, and the shape, size, surface area and activity of the particles have a great influence on the necessary reinforcement.

The precipitated silicas are manufactured by the precipitation method in which a stoichiometric combination of sodium silicate and a mineral acid such as sulfuric acid react in an alkaline medium. This method forms primary and nanometric particles rising to a diameter of about 100 nm, and with greater weight, results in precipitation by the aggregate formed by flocculation in alkaline medium.

When applied in rubber compounds, precipitated silica reinforces the: abrasion, tear resistance, and elongation properties of the rubber. Precipitated silica also significantly contributes to greater tire adhesion and lower fuel consumption in certain tire tread compositions and types, mainly the so-called green tires.

U.S. Pat. No. 9,034,962 relates to a method for preparing a vulcanizable elastomeric composition, which is useful in the production of tire compounds with enhanced precipitated silica reinforcement. The vulcanizable elastomeric composition is prepared by mixing at a temperature of at least 25° C., an elastomer having an interactive silica functional group, a synthetic mineral filler comprising precipitated silica, and optionally a catalyst. This initial composition comprises less than about 5 parts by weight of any zinc oxide, sulfur or curing agent per hundred parts by weight of rubber.

U.S. Pat. No. 6,313,210 refers to vulcanizable elastomeric compounds containing silica as a reinforcement filler having moisture stabilized polymers in precipitated silica compositions or a mixture of precipitated silica and carbon black and a silica dispersion processing aid to produce vulcanized elastomeric compounds with improved physical properties. Particularly, the invention provides vulcanizable elastomeric compounds reinforced with precipitated silica comprising polymers terminated in alcoxysilane that have been stabilized by moisture by the reaction of the alcoxysilane terminal group with an effective quantity of long-chain alcohol as a viscosity stabilizing agent after polymerization but before desolvenization.

U.S. Pat. No. 5,804,636 relates to the production process of a vulcanizable rubber composition containing precipitated silica and having a low carbon black content. A precipitated silica-based reinforcement filler and a silane-based coupling agent are added and closely mixed with other ingredients of the compound in subsequent steps at a temperature of 165° C. and 180° C. and between 110° C. and 160° C., respectively. The rubber composition thus obtained has improved precipitated silica dispersion and constant physical-mechanical characteristics and a better stretching capacity. This composition is particularly suitable for the manufacture of tire treads for tires with low rolling resistance.

U.S. Pat. No. 5,336,730 refers to the development of a tire with a tire tread comprised of elastomer, precipitated silica, optionally carbon black and a coupling agent for precipitated silica, comprised of dithiodipropionic acid. The tread tires are reinforced with precipitated silica. In one respect, the tire tread is comprised of rubber, particularly sulfur-cured rubber, reinforced with a combination of precipitated silica and a defined coupling agent and, optionally, carbon black.

U.S. Pat. No. 8,440,750 discusses the reinforcement of rubber with precipitated silicas. Example V reports that neither silica gel nor allyl-treated silica gel are suitable as reinforcement of rubber.

Although precipitated silicas can provide adequate reinforcement for certain rubber products, there is a need for a reinforcing agent that can provide improved tear resistance, elongation and adherence to wet surfaces.

SUMMARY OF THE INVENTION

Complete replacement of the precipitated silica with silica gel results in a rubber composition that is too rigid for practical use. However, the inventors have unexpectedly discovered that the use of silica gel as a partial replacement for precipitated silicas results in a rubber product having improved abrasion, tear resistance and elongation properties as well as better tire adhesion for certain tire applications.

Gel-type silicas are produced by the reaction of sodium silicate and sulfuric acid, or another mineral acid, in an acid medium. This reaction forms a hydrosol, which in this case is a gel-type structure with high water content called a hydrogel. After drying, the hydrogel is called xerogel. The dry silica gel, xerogel, is treated to eliminate sodium sulfate, a byproduct of the gel process, with subsequent physical-chemical treatment aiming at changes in the surface area, pore volume, pH and morphological structure.

Gel-type silicas are usually used as selective adsorption agents in beverages and oils due to their polarity and adsorption level of metals or proteins, matting or coating agents for paints or varnishes due to their irregular surface and high transparency due to their refraction index, anti-blocking agents for transparent plastic films due to their transparency, abrasive agents for toothpaste and desiccant agents and/or fluidizing agents for hygroscopic powders.

In this context, the addition of silica gel to rubber compositions proposes to further elevate the performance of these properties.

There is a need to increase the performance of tires in aspects related to safety. It has been surprisingly found that gel-type silica, which has distinct or unique physical characteristics compared to precipitated silica, can serve as a partial replacement for the precipitated silica reinforcement filler in rubber compounds for the tire market.

The rubber compounds of the present invention with the addition of gel-type silica can be used in a number of products including:
Production of tires for light vehicles
Production of tires for heavy-duty vehicles
Conveyor belts for mining
Production of tires for off-road vehicles The addition of gel-type silicon dioxide adds to the rubber compound structure and surface activity that differs from precipitated silica.

Precipitated silicas applied to rubber compounds usually have a porosity level at the rate of 0.3 to 0.9 cubic centimeters per gram of silica, while silica gels used in development have a porosity level in the range of 1.0 to 1.8 cubic centimeters per gram of silica. Additionally, precipitated silicas have a surface area at the rate of 150 to 190 cubic centimeters per gram of silica, while silica gels used in the present invention have a surface area level in the range of 200 to 500 cubic centimeters per gram of silica.

In a presently preferred embodiment, the present invention is a reinforced rubber compound which includes both precipitated silica and silica gel as reinforcement fillers. The ratio of silica gel to total silica (precipitated silica and silica gel) ranges from 5% to 30%.

The silica gel used in the present invention has a porosity in the range of 1.0 to 1.8 cubic centimeters per gram of silica gel, a surface area in the range of 200 to 500 square meters per 1 gram of silica gel, a pH between 5.5 and 8.5, and a particle size in the range of 1 micron to 100 microns

PREFERRED FORM OF EMBODIMENT OF THE INVENTION

Figure 1:
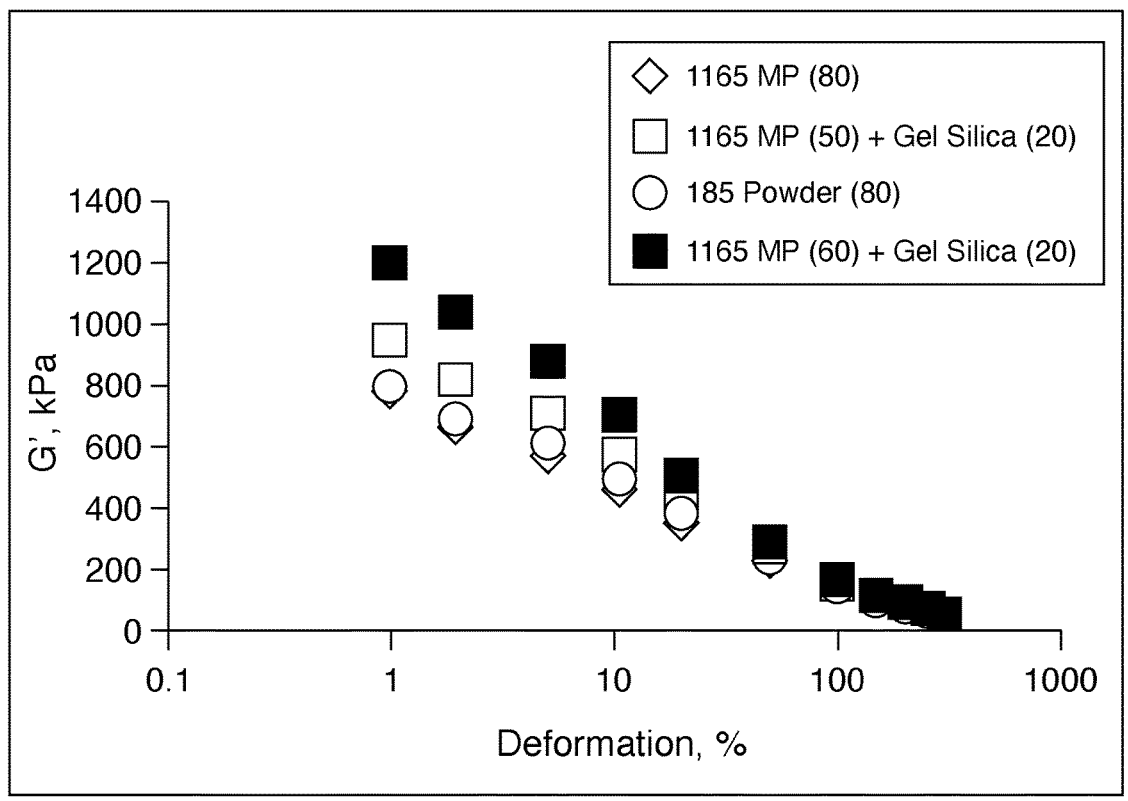
FIG. 1 is a chart showing the elastic shear modulus curves as a function of deformation for non-vulcanized rubber compositions.

Although the present invention is described with reference to preferred embodiments, it will be understood by those skilled in the art that several changes can be made and the equivalents can be replaced by elements thereof.

A reinforced rubber compound is prepared using both precipitated silica and silica gel as reinforcement fillers. Preferably, the ratio of silica gel to total silica (precipitated silica and silica gel) ranges from 5% to 30%. Preferably, the silica gel has a porosity in the range of 1.0 to 1.8 cubic centimeters per gram of silica gel, a surface area in the range of 200 to 500 square meters per 1 gram of silica gel, a pH between 5.5 and 8.5, and a particle size in the range of 1 micron to 100 microns Studies of silica gel were performed in comparative tests together with the reference precipitated silicas (Zeosil 185® powder and medium and high-dispersion Zeosil 1165 MP®, respectively) and/or highly reinforced carbon black N234.

Rubber Compounds Formulations

Rubber compound formulations were developed for the application of tire treads for passenger cars. One or more types of silica were used only as reinforcement filler together with low carbon black content (N234)

Tables 1a and 1b show the comparative formulations for "Green Tire" tread type for comparisons between silicas and their combinations, where the nomenclature of each sample (rubber composition) is related to the type(s) and quantity(s) in phr (parts per hundred of rubber) of silica in each formulation. Note that attempts of rubber compositions with the use of 80 phr of gel-type silica or 40 phr of gel-type silica together with 40 phr of high dispersion precipitated silica Zeosil 1165 MP® were made, but the high content of gel-type silica in the formulations promoted high viscosity of the compositions, making them unprocessable and, therefore, the use of gel-type silica was intended as a promoter or propellant of specific properties.

TABLE 1a

| Raw materials in phr (parts per hundred of rubber) | "Green Tire" Formulas Compositions | | | |
|---|---|---|---|---|
| | 1165 MP (80) | 1165 MP (50) + Gel Silica (20) | 185 powder (80) | 1165 MP (60) + Gel Silica (20) |
| SSBR SL 4518-4 (1) | 103.2 | 103.17 | 103.17 | 103.17 |
| High cis polybutadiene (>96%) Buna CB 24 (2) | 25.0 | 25.0 | 25.0 | 25.0 |
| Zeosil ® Silica 1165 MP (3) | 80.0 | 50 | | 60 |
| Zeosil ® Silica 185 powder (4) | | | 80 | |
| Gel Silica | | 20 | | 20 |
| Carbon Black N234 | 7.0 | 7.0 | 7.0 | 7.0 |
| Silane Si 69 ® (5) | 6.4 | 5.6 | 6.4 | 6.4 |
| Stearic Acid | 2.0 | 2.0 | 2.0 | 2.0 |
| Zinc Oxide | 2.5 | 2.5 | 2.5 | 2.5 |
| Q-flux 21 (6) | 2.0 | 2.0 | 2.0 | 2.0 |
| Unilene A 90 Resin (7) | 5.0 | 5.0 | 5.0 | 5.0 |
| 6PPD (8) | 2.0 | 2.0 | 2.0 | 2.0 |
| TMQ (9) | 1.0 | 1.0 | 1.0 | 1.0 |
| 100% sulfur | 1.4 | 1.4 | 1.4 | 1.4 |
| CBS 100% (10) | 1.7 | 1.7 | 1.7 | 1.7 |
| DPG 100% (11) | 2.0 | 2.0 | 2.0 | 2.0 |
| Total | 241.2 | 230.4 | 241.2 | 241.2 |

TABLE 1b

| "Green Tire" Formulas | Compositions 75 phr (silica) | | |
|---|---|---|---|
| Raw materials in phr (parts per hundred of rubber) | 1165 MP (75) | 1165 MP (70) + Gel Silica (5) | 1165 MP (65) + Gel Silica (10) |
| SSBR SL 4518-4 (1) | 103.17 | 103.17 | 103.17 |
| High cis polybutadiene (>96%) Buna CB 24 (2) | 25.00 | 25.00 | 25.00 |
| Zeosil ® Silica 1165 MP (3) | 75.00 | 70.00 | 65.00 |
| Gel Silica | 0.00 | 5.00 | 10.00 |
| Carbon Black N234 | 7.00 | 7.00 | 7.00 |
| Silane Si 69 ® (5) | 6.00 | 6.10 | 6.20 |
| Stearic Acid | 2.00 | 2.00 | 2.00 |
| Zinc Oxide | 2.50 | 2.50 | 2.50 |
| Q-flux 21(6) | 2.00 | 2.00 | 2.00 |
| Unilene A 90 Resin (7) | 5.00 | 5.00 | 5.00 |
| 6PPD (8) | 2.00 | 2.00 | 2.00 |
| TMQ (9) | 1.00 | 1.00 | 1.00 |
| 100% sulfur | 1.75 | 1.75 | 1.75 |
| CBS 100% (10) | 2.15 | 2.15 | 2.15 |
| DPG 100% (11) | 2.00 | 2.00 | 2.00 |
| Total | 236.57 | 236.67 | 236.77 |

Processing of Compounds

Stage 1. The raw materials are incorporated in a silanization step in a Haake mixer using tangential type rotors (Banbury) to form a masterbatch. The chamber filling factor is 62%, the initial temperature is 80° C., and the rotation speed is 60 rpm. After the addition of all inputs, the temperature is raised and maintained in the range of 140° C. to 155° C. for three minutes.

Stage 2. Incorporation of raw materials to the masterbatch produced in the first stage with completion of the silanization reaction (2 minutes in the range between 140 and 155° C.) in a Haake mixer using tangential type rotors (Banbury), filling factor of 0.62, initial temperature and rotation of 90° C. and 90 rpm, respectively. The raw materials were added to the masterbatch of the previous step.

Each masterbatch prepared in the second stage was accelerated in an open cylinder-type mixer MAC-COPÉ. The masterbatches were accelerated with roller temperature in the cylinder at 50° C. and a speed thereof at 14:17 rpm in a total time for this mixing step of 8 minutes.

Table 2 shows the order of addition of the components and the cumulative processing time for making the compound.

TABLE 2

| Stage | Order of addition | Cumulative Time, min | Raw Materials/Guidelines |
|---|---|---|---|
| 1 | 1 | 0 | Rubbers |
| | 2 | 1 | ⅓ Filler (Silica) + Silane + NF (Green Tire) |
| | 3 | 2.5 | ⅓ Filler (NF or Silica) + Q-flux + A90 Resin |
| | 4 | 4.4 | ⅓ Filler (NF or Silica) + Stearic Acid |
| | no addition | variable | Rotation/Temperature Adjustment |
| | no addition | variable | Silanization (140 155° C.) |
| | approximate time | 10 | Masterbatch Download Stage 1 |
| 2 | 1 | 0 | Masterbatch Stage 1 |
| | 2 | 1 | TMQ + 6PPD + Zinc Oxide |
| | no addition | variable | Rotation/Temperature Adjustment |
| | no addition | variable | Silanization (140 155° C.) |
| | approximate time | 5 | Masterbatch Download Stage 2 |

Curing Properties

The curing characteristics of the non-vulcanized elastomeric compounds were determined through their rheometric curve. The equipment used was the RPA 2000 rheometer, according to the ASTM D 5289-17 standard. The following test conditions were used: arc±0.5°; temperature 160° C.; time 30 minutes, and frequency 100 cpm. The parameters evaluated were: ts1 safety time (scorch) that characterizes the beginning of the curing process; t90 time to reach 90% torque of the torque-time curve; ML minimum torque that records the minimum value of torque in the curve; MH maximum torque or the highest torque of the rheometric curve and maximum curing rate.

Specimen Preparation

For physical and mechanic al tests of the samples, samples were vulcanized at 160° C. in the timepoint of (t90+2) minutes under compression: 150×150×2 mm plates and 16×6 mm bungs. 4.2.7 Shore A Hardness Test performed in digital equipment Shore A. The measurement was obtained with the aid of durometer support, according to ASTM D2240-15, with a reading time of 1 second in 3-layer stacked tensile specimens. The result of each sample is the average of five determinations with a standard deviation.

Results and Remarks

Tables 3a and 3b show the results of testing regarding rheometry performance or rheological properties.

TABLE 3a

| Property | 1165 MP (80) | 1165 MP (50) + Gel Silica (20) | 185 powder (80) | 1165 MP (60) + Gel Silica (20) |
|---|---|---|---|---|
| Minimum torque-ML, dN · m | 4.31 | 5.18 | 4.85 | 6.97 |
| Maximum torque-MH, dN · m | 22.91 | 22.79 | 21.19 | 25.07 |
| Delta Torque, dN · m | 18.6 | 17.61 | 16.34 | 18.1 |
| Scorch time-ts1, min | 0.73 | 0.92 | 0.96 | 0.94 |
| Optimum curing time-t90, min | 5.04 | 4.82 | 6.03 | 6.01 |
| Maximum curing rate, dN · m/min | 6.89 | 5.42 | 5.16 | 5.1 |

TABLE 3b

| Property | 1165 MP (75) | 1165 MP (70) + Gel Silica (5) | 1165 MP (65) + Gel Silica (10) |
|---|---|---|---|
| Minimum torque-ML, dN · m | 3.52 | 3.97 | 4.31 |
| Maximum torque-MH, dN · m | 20.23 | 20.89 | 21.55 |
| Delta Torque, dN · m | 16.71 | 16.92 | 17.24 |
| Scorch time-ts1, min | 0.91 | 0.95 | 0.92 |
| Optimum curing time-t90, min | 5.39 | 5.34 | 5.29 |
| Maximum curing rate, dN · m/min | 6.83 | 6.70 | 6.23 |

Evaluations of Cured Compounds

The compounds were vulcanized by compression at 160° C. and evaluated regarding the density, Shore A hardness, traction, tearing and abrasion tests outcomes as well as the dynamic-mechanical test relative to the tan delta at 0°. Tables 4a and 4b show the outcomes, on average, with the values of standard deviations.

TABLE 4a

| Physical-mechanical properties | 1165 MP (80) | 1165 MP (50) + Gel Silica (20) | 185 powder (80) | 1165 MP (60) + Gel Silica (20) |
|---|---|---|---|---|
| Elongation Break (%) (ASTM D412) | 471 | 511 | 487 | 540 |
| Tearing, N/mm (ASTM D624) | 43.70 | 45.11 | 40.98 | 49.57 |
| Density, g/cm³ (ISO 1183-1) | 1.1799 | 1.1626 | 1.1788 | 1.1740 |
| delta tan at 0° C. | 0.1280 | 0.1324 | 0.1306 | 0.1325 |

TABLE 4b

| Physical-mechanical properties | 1165 MP (75) | 1165 MP (70) + Gel Silica (5) | 1165 MP (65) + Gel Silica (10) |
|---|---|---|---|
| Elongation Break (%) (ASTM D412) | 508 | 530 | 520 |
| Tearing, N/mm (ASTM D624) | 47.90 | 51.09 | 52.13 |
| Density, g/cm³ (ISO 1183-1) | 63.6 | 64.5 | 64.6 |
| delta tan at 0° C. | 0.1882 | 0.1923 | 0.1939 |

FIG. 1 shows the Elastic shear modulus curves as a function of deformation for non-vulcanized rubber compositions to understand if the deformation was different than regular recipes with precipitated silica.

Elongation at Break (AR)

Figure 2:
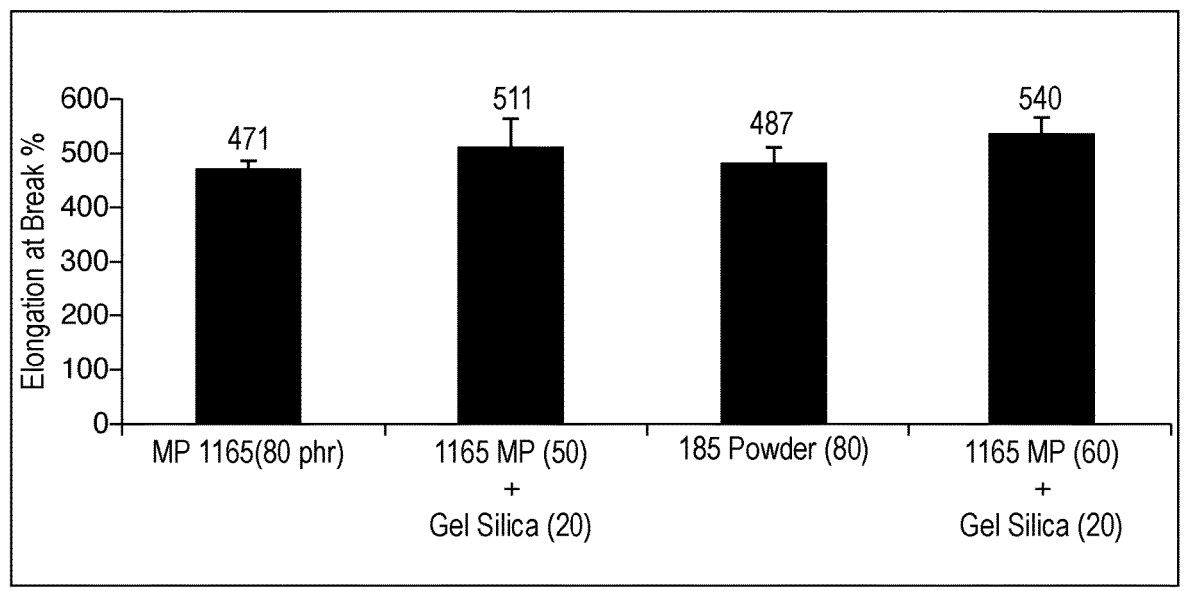
FIG. 2 is a chart showing a comparison of the elongation at break of a first set of options of the present invention and the prior art.

On average, the elongation values are higher for elastomeric compositions using gel silica, which in option 1165 MP (60)+Gel Silica (20) reached an elongation rate of 14.6% above in comparison with reference Zeosil silica 1165 MP 80 phr and 10.9% above in comparison with reference Zeosil silica 185 powder. Additionally, the option with a lower level of combined silica, 1165 MP (50)+Gel Silica (20) reached an elongation rate of 8.5% higher compared to reference silica 1165 MP 80 phr and 4.9% higher compared to reference Zeosil silica 185 powder, consistently showing the performance gain with the addition of Gel Silica, as highlighted in FIG. 2.

Figure 3:
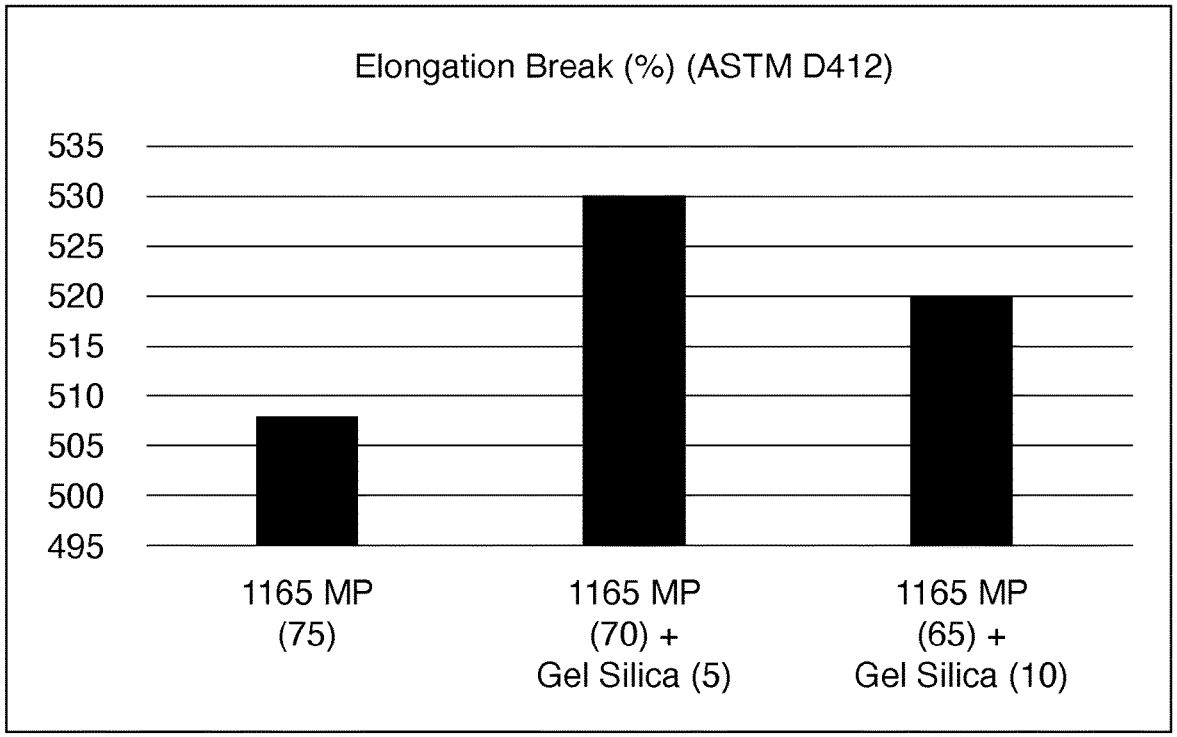
FIG. 3 is a chart showing a comparison of the elongation at break of a second set of options of the present invention and the prior art.

The elongation values are also higher for option 1165 MP (70)+Gel Silica (5) which reached an elongation rate of 4.3% above in comparison with reference Zeosil silica 1165 MP 75 phr and for the option 1165 MP (65)+Gel Silica (10) which had results 2.4% higher compared to reference Zeosil silica 1165 MP 75 phr, consistently showing the performance gain with the addition of Gel Silica as an additive, as highlighted in FIG. 3.

Tear Resistance

Figure 4:
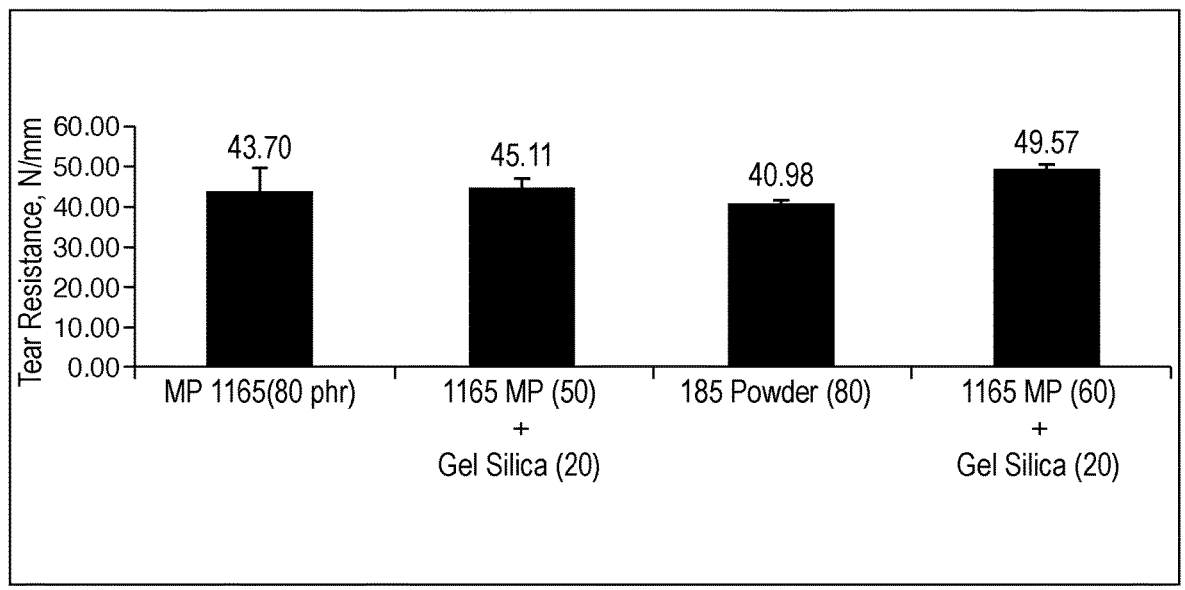
FIG. 4 is a chart showing a comparison of the tear resistance of a first set of options of the present invention and the prior art.

On average, the tearing resistance values are higher for elastomeric compositions using gel silica, which in option 1165 MP (60)+Gel Silica (20) reached a tearing resistance level in the ratio of 13.4% above in comparison with reference silica 1165 MP 80 phr and 21% above in comparison with reference Zeosil silica 185 powder. Additionally, the option with a lower level of combined silica, 1165 MP (50)+Gel Silica (20), reached a tearing rate of 3.2% higher compared to reference silica 1165 MP 80 phr and 10.1% higher compared to reference Zeosil silica 185 powder, consistently showing the performance gain with the addition of Gel Silica, as highlighted in FIG. 4.

Figure 5:
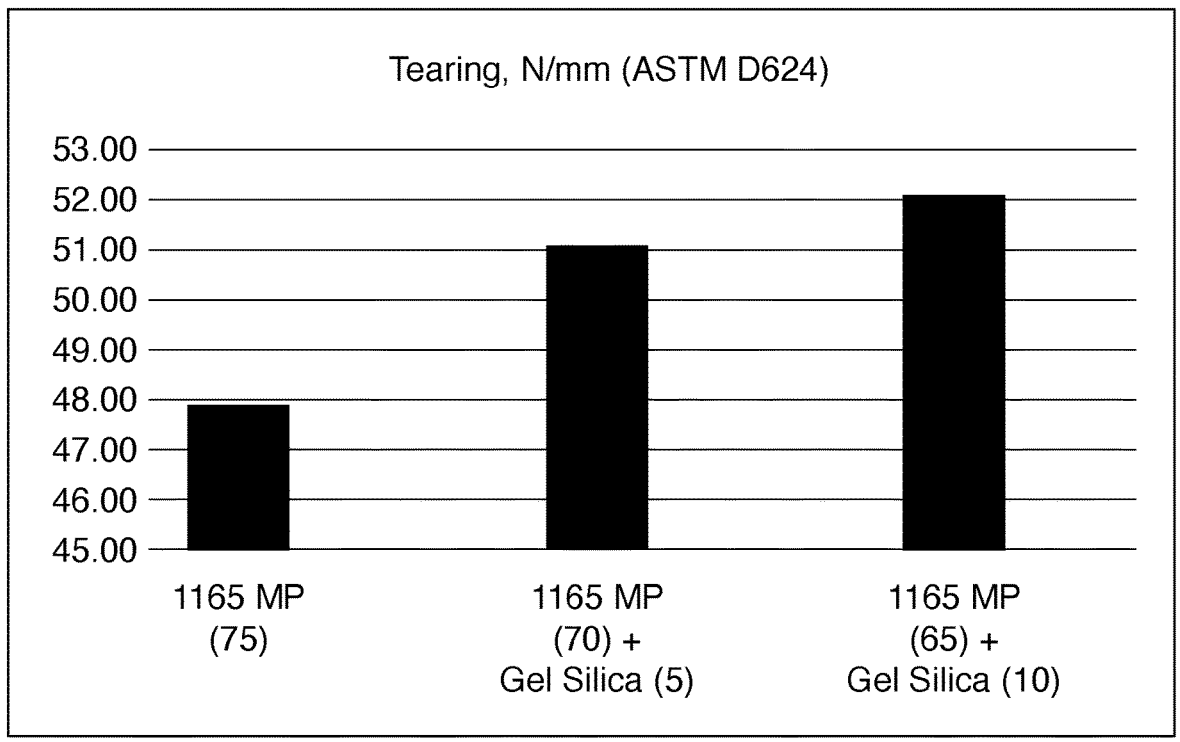
FIG. 5 is a chart showing a comparison of the tear resistance of a second set of options of the present invention and the prior art.

The tearing resistance values are also higher for option 1165 MP (65)+Gel Silica (10) which reached a tearing resistance level in the ratio of 8.8% above compared to reference silica 1165 MP 75 phr and for option 1165 MP (70)+Gel Silica (5) which had results 6.7% higher than reference Zeosil silica 1165 MP 75 phr, consistently showing the gain of performance with the addition of Gel Silica as an additive, as highlighted in FIG. 5.

Adhesion Performance in Wet Surface in Delta Tan at 0° C.

Figure 6:
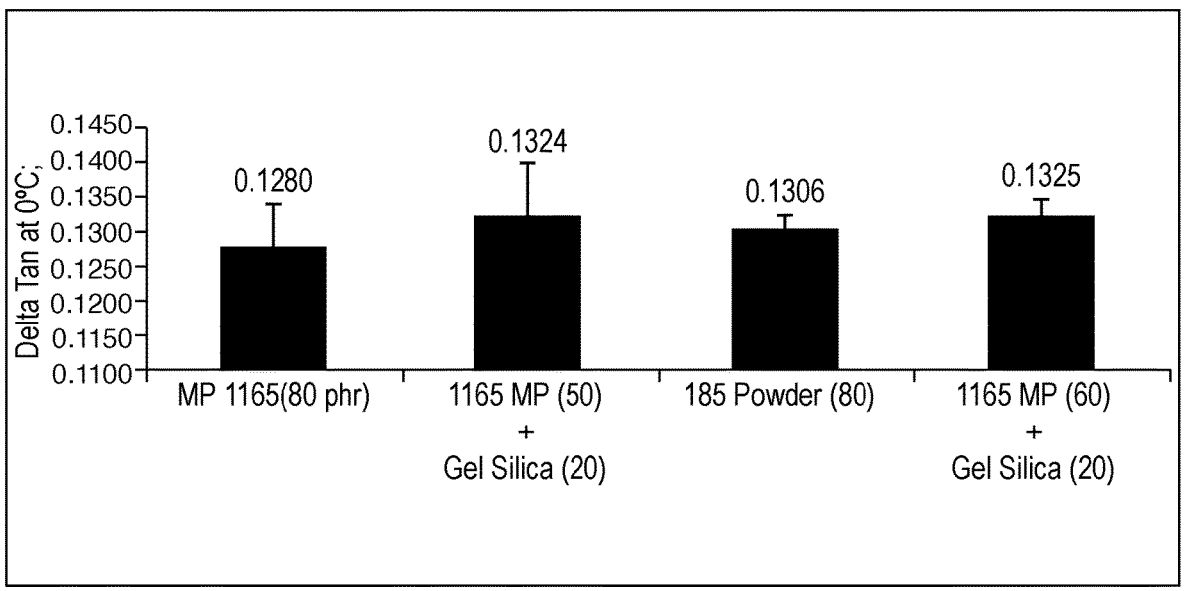
FIG. 6 is a chart showing a comparison of the adhesion rate in wet surface in delta tan at 0° C. of a first set of options of the present invention and the prior art.

On average, the adhesion performance in wet surface in delta tan at 0° C. are higher for elastomeric compositions using gel silica, which in option 1165 MP (60)+Gel Silica (20) reached an adhesion performance in wet surface in delta tan at 0° C. level in the ratio of 3.5% above in comparison with reference silica 1165 MP 80 phr and 3.4% above in comparison with reference Zeosil silica 185 powder. Additionally, the option with a lower level of combined silica, 1165 MP (50)+Gel Silica (20) reached an adhesion rate in wet surface in delta tan at 0° C. of 1.5% higher compared to reference silica 1165 MP 80 phr and 1.4% higher compared to reference Zeosil silica 185 powder, consistently showing the performance gain with the addition of Gel Silica, as highlighted in FIG. 6.

Figure 7:
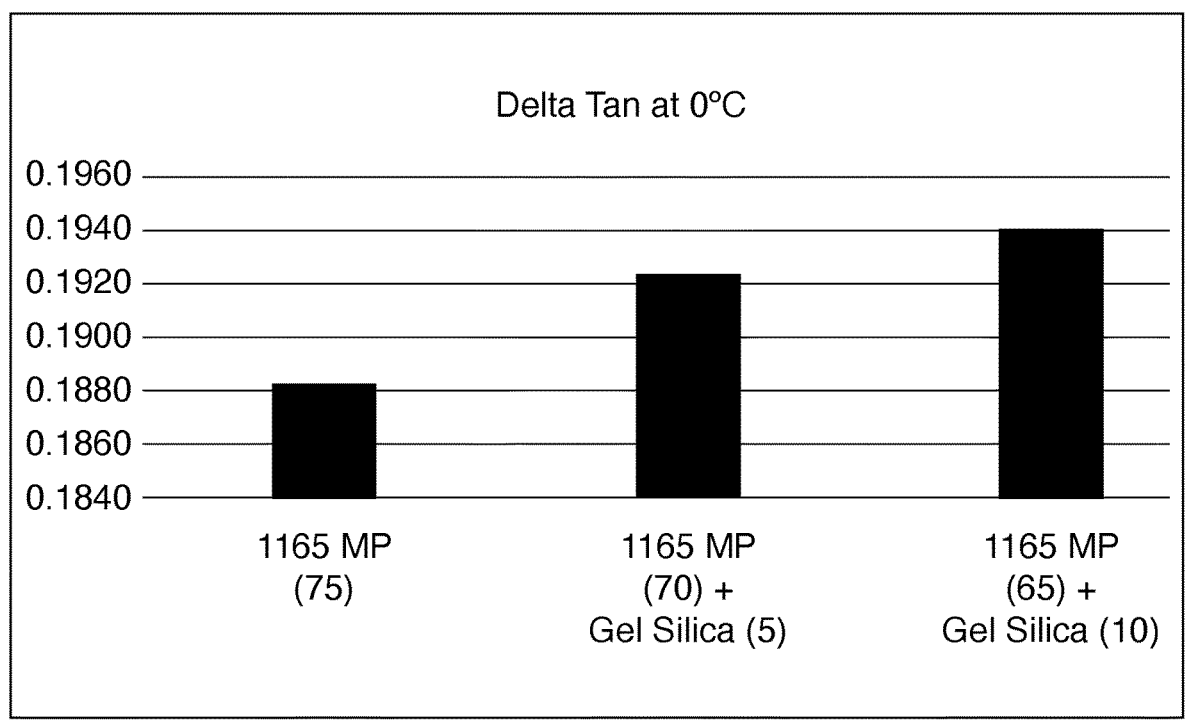
FIG. 7 is a chart showing a comparison of the adhesion rate in wet surface in delta tan at 0° C. of a second set of options of the present invention and the prior art.

The adhesion performance in wet floor in delta tan at 0° C. are also higher for option 1165 MP (65)+Gel Silica (10) which reached an adhesion performance in the wet floor in delta tan at 0° C. level in the ratio of 3.0% above in comparison with reference silica 1165 MP 75 phr, and for option 1165 MP (70)+Gel Silica (5) which had results 2.2% higher than the reference silica 1165 MP 75 phr, consistently showing the performance gain with the addition of Gel Silica as an additive, as highlighted in FIG. 7.

Although the description above contains certain specificities, they should not be interpreted as limitations to the scope of the invention, but as an example of a preferred embodiment of the same. Therefore, the scope of the present invention must not be determined by the embodiments illustrated, but by the attached set of claims and its legal equivalents.

We claim:

1. A reinforced rubber compound comprising rubber and reinforcement fillers, wherein said reinforcement fillers comprise precipitated silica and unmodified silica gel, wherein the unmodified silica gel ranges comprises from 5 wt % to 30 wt % of the total silica content of the reinforcement fillers.

2. The reinforced rubber compound of claim 1, wherein said unmodified silica gel has a porosity in the range of 1.0 to 1.8 cubic centimeters per gram of unmodified silica gel, a surface area in the range of 200 to 500 square meters per 1 gram of unmodified silica gel, a pH between 5.5 and 8.5, and a particle size in the range of 1 micron to 100 microns.

3. The reinforced rubber compound of claim 1, wherein said unmodified silica gel has a porosity in the range of 1.0 to 1.8 cubic centimeters per gram of unmodified silica gel.

4. The reinforced rubber compound of claim 1, wherein said unmodified silica gel has a surface area in the range of 200 to 500 square meters per 1 gram of unmodified silica gel.

5. The reinforced rubber compound of claim 1, wherein said unmodified silica gel has a pH between 5.5 and 8.5.

6. The reinforced rubber compound of claim 1, wherein said unmodified silica gel has a particle size in the range of 1 micron to 100 microns.

7. The reinforced rubber compound of claim 1, wherein said unmodified silica gel has a porosity in the range of 1.0 to 1.8 cubic centimeters per gram of unmodified silica gel, a surface area in the range of 200 to 500 square meters per 1 gram of unmodified silica gel, a pH between 5.5 and 8.5, and a particle size in the range of 1 micron to 100 microns.

* * * * *